UNITED STATES PATENT OFFICE.

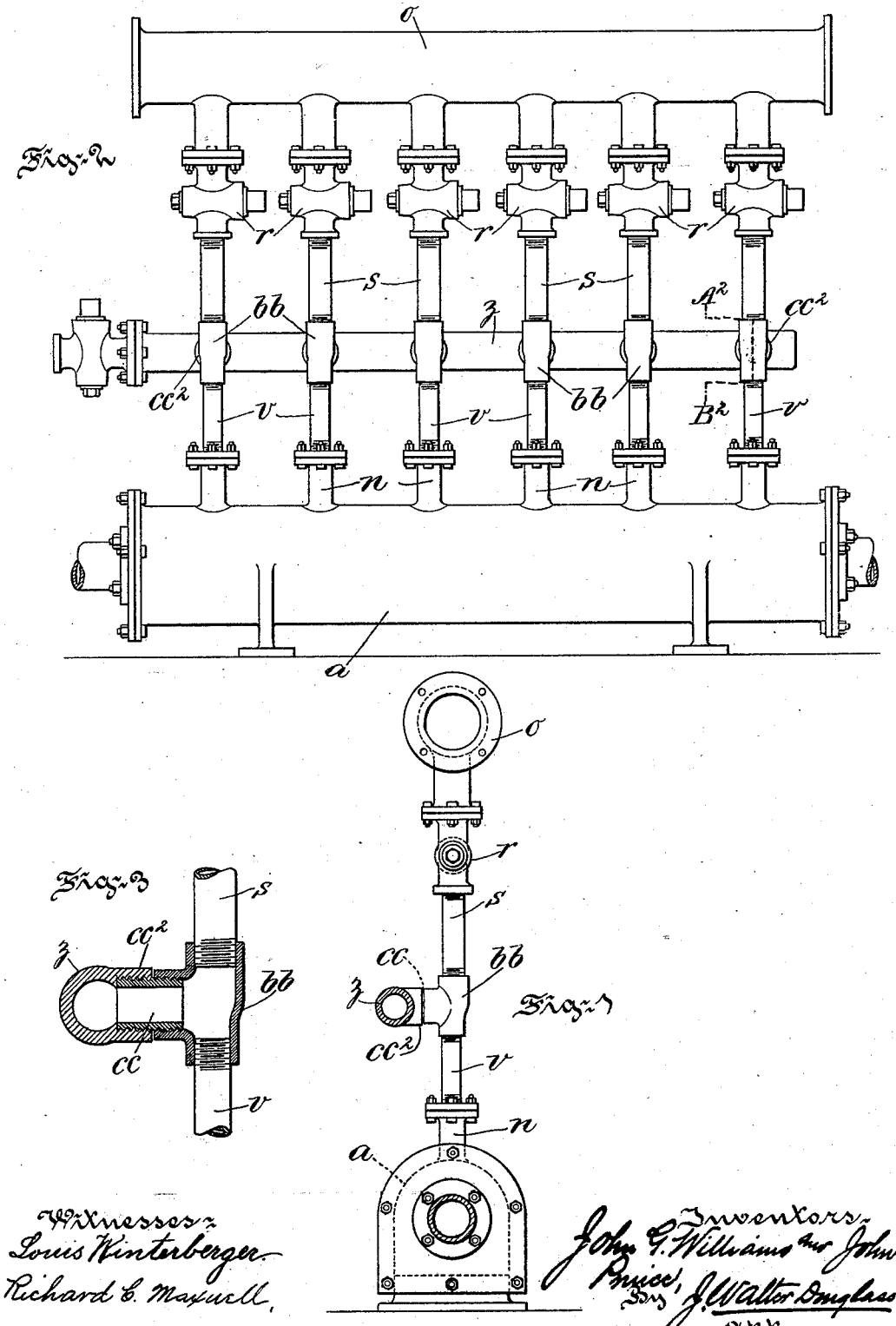

JOHN GEORGE WILLIAMS AND JOHN PRINCE, OF BIRMINGHAM, ENGLAND; SAID PRINCE ASSIGNOR TO SAID WILLIAMS.

FEED-WATER HEATER.

SPECIFICATION forming part of Letters Patent No. 553,145, dated January 14, 1896.

Application filed February 14, 1895. Serial No. 538,338. (No model.) Patented in England April 30, 1892, No. 8,179, and March 29, 1893, No. 6,604.

*To all whom it may concern:*

Be it known that we, JOHN GEORGE WILLIAMS, builders' merchant and contractor, of Richmond House, Poplar Avenue, Hagley Road, and JOHN PRINCE, engine-fitter, of 12 Eyre Street, Spring Hill, both of Birmingham, in the county of Warwick, England, subjects of Her Majesty the Queen of England, have invented an Improved Feed-Water Heater, (for which Letters Patent have been obtained in England, No. 8,179, dated April 30, 1892, and No. 6,604, dated March 29, 1893,) of which the following is a specification.

This invention has for its object the utilization of exhaust-steam from the cylinders of steam-engines and elsewhere to heat water and so introduce into the boiler containing water heated water instead of cold water, and thereby reduce the consumption of coal or other fuel usually used in getting up steam.

The nature, characteristic features, and scope of our invention will be more fully understood from the following description, when taken in connection with the accompanying drawings, forming a part hereof, and in which—

Figure 1 is an end elevation of a feed-water heater embodying features of our invention. Fig. 2 is a front elevation of the same; and Fig. 3 is a section taken on the line $A^2 B^2$ of Fig. 2, illustrating the construction of the diminishing sockets and connections.

Referring to the drawings, $a$ represents a receiving-chamber, $o$ the exhaust-steam-supply chamber, and $z$ represents the separate cold-water-supply conduit. To the flanged branch pipes leading from the steam-chamber $o$ we connect the flanged cut-off cocks $r$ at one end thereof and to the other end of the cocks $r$ we connect the short branch pipes $s$. To the flanged branches $n$ of the receiving-chamber $a$ we connect the flanged downtake-pipes $v$. The branch pipes $s$ and downtake-pipes $v$ are connected by means of the diminishing sockets $b\ b$, as illustrated in Fig. 3—that is to say, to the smaller end of the socket $b\ b$ is secured one end of the downtake-pipe $v$, and to the larger end of said socket $b\ b$ is secured the end of branch pipe $s$. The water-conduit $z$ may be formed of one continuous piece of piping, from which projects the screw-nipples $c\ c^2$, as shown in Fig. 3, and is united to the diminishing sockets $b\ b$ by means of the interior screw-nipples $c\ c$, as shown in Fig. 3.

Having described the nature and objects of our invention, what we claim as new, and desire to secure by Letters Patent, is—

In a feed water heater, a receiving chamber, an exhaust steam supply chamber and a separate water supply conduit, a series of pipes leading from the steam chamber, cut off cocks controlling the same, a series of short branch pipes leading from the cut off cocks, a series of branches leading from the water supply conduit, a series of diminishing sockets connecting the branch pipes of the cut off cocks with the water supply branches and a series of down take pipes connected with the reduced end of the diminishing sockets and leading into the receiving chamber, substantially as and for the purposes described.

In testimony whereof we have hereunto set our signatures in the presence of two subscribing witnesses.

JOHN GEORGE WILLIAMS.
JOHN PRINCE.

Witnesses:
ALBERT NEURY,
REGINALD FREU MORGAN.